United States Patent
Ito (10) Patent No.: US 11,750,976 B2
(45) Date of Patent: Sep. 5, 2023

(54) IN-VEHICLE SOUND EMITTING DEVICE

(71) Applicant: Alps Alpine Co., LTD, Tokyo (JP)

(72) Inventor: Ryo Ito, Iwaki (JP)

(73) Assignee: Alps Alpine Co., LTD, Tokyo (JP)

( * ) Notice: Subject to any disclaimer, the term of this patent is extended or adjusted under 35 U.S.C. 154(b) by 126 days.

(21) Appl. No.: 17/538,121

(22) Filed: Nov. 30, 2021

(65) Prior Publication Data
US 2022/0174407 A1 Jun. 2, 2022

(30) Foreign Application Priority Data
Dec. 1, 2020 (JP) .................................. 2020-199569

(51) Int. Cl.
*H04R 7/02* (2006.01)
*B60R 11/02* (2006.01)

(52) U.S. Cl.
CPC ............ *H04R 7/02* (2013.01); *B60R 11/0217* (2013.01)

(58) Field of Classification Search
CPC .............................. H04R 7/02; B60R 11/0217
USPC ........................................................ 381/386
See application file for complete search history.

(56) References Cited

U.S. PATENT DOCUMENTS

| | | | |
|---|---|---|---|
| 9,913,084 B2 | 3/2018 | Okutani et al. | |
| 2013/0308815 A1* | 11/2013 | Alvarez Ibarra | ........ H04R 7/18 381/386 |
| 2017/0106787 A1 | 4/2017 | Kim | |
| 2018/0027369 A1* | 1/2018 | Okutani | .............. H04M 1/6075 381/302 |
| 2020/0320970 A1 | 10/2020 | Uchimura et al. | |

FOREIGN PATENT DOCUMENTS

| | | |
|---|---|---|
| EP | 3 072 733 | 9/2016 |
| JP | 2009-100194 | 5/2009 |
| JP | 2011-31865 | 2/2011 |

OTHER PUBLICATIONS

Extended European Search Report dated May 10, 2022 in European Patent Application No. 21210772.6.

* cited by examiner

*Primary Examiner* — Sean H Nguyen
(74) *Attorney, Agent, or Firm* — Crowell & Moring, L.L.P.

(57) ABSTRACT

One form of an in-vehicle sound emitting device includes a front case and a rear case. The front case is partitioned from the rear case by a partition plate made from a metal plate. Rear space inside the rear case is sealed, and an electronic circuit is disposed in the rear space. A loudspeaker is mounted in front space inside the front case. By using two of the partition plates having the same structure, the front case having the incorporated loudspeaker and the rear case having the incorporated electronic circuit can be disposed separately.

8 Claims, 6 Drawing Sheets

IN-VEHICLE SOUND EMITTING DEVICE

RELATED APPLICATION

The present application claims priority to Japanese Patent Application Number 2020-199569, filed Dec. 1, 2020, the entirety of which is hereby incorporated by reference.

BACKGROUND

1. Field of the Disclosure

The present disclosure relates to an in-vehicle sound emitting device having a loudspeaker and an electronic circuit housed in a case.

2. Description of the Related Art

JP 2011-31865 A describes an alarm unit serving as an in-vehicle sound emitting device. The alarm unit is mounted to alert pedestrians to the presence of an approaching vehicle by producing an engine sound when an electric or hybrid vehicle is driven by an electric motor. The alarm unit includes a speed sensor, switches provided in the vicinity of a steering wheel, a playback unit, a recording unit, a selection unit, a playback operation unit, and a loudspeaker provided in an engine compartment.

JP 2009-100194 A describes a speaker array equipped with a plurality of loudspeakers. Although this speaker array is not for in-vehicle use, a plurality of loudspeakers and a printed circuit board having an amplifier circuit or the like mounted thereon are housed inside a housing surrounded by a plate member. The inside of the housing is partitioned into two spaces by a partition plate made of aluminum or the like. A loudspeaker is disposed in one of the two spaces, and a printed circuit board is disposed in the other space.

SUMMARY OF THE DISCLOSURE

An in-vehicle sound emitting device serving as the alarm unit described in JP 2011-31865 A is used in an environment where moisture, such as rain, and a large amount of dust and dirt are likely to adhere thereto. For this reason, it is desirable to set the loudspeaker and the printed circuit board in a housing (a case) for use. In this case, the inside of the housing needs to be maximally completely sealed.

In addition, JP 2009-100194 A describes a loudspeaker and an electronic circuit housed inside a housing. However, the described speaker array is not intended for in-vehicle use and, thus, the inside of the housing is not sufficiently sealed. Furthermore, in the speaker array, the housing is formed so as to be surrounded by top, bottom, right, and left plate members, and a partition plate is provided inside the housing to partition the housing. For this reason, it is difficult to assemble the partition plate inside the housing. In addition, a housing having the loudspeaker therein cannot be separated from a housing having the printed circuit board therein and, thus, the loudspeaker and the printed circuit board cannot be separately mounted with the loudspeaker and the printed circuit board disposed in the housings.

Accordingly, it is an objective of the present disclosure to provide an in-vehicle sound emitting device in which a loudspeaker and an electronic circuit are disposed in separate internal spaces of a housing so as to protect the electronic circuit from the external environment and facilitate assembly of the case.

It is another objective of the present disclosure to provide an in-vehicle sound emitting device enabling a loudspeaker and an electronic circuit both disposed in a case to be separately mounted therein.

In one form of the present disclosure, an in-vehicle sound emitting device includes a case, a loudspeaker accommodated in the case, and an electronic circuit incorporated in the case. The case includes a front case that forms front space, a rear case that forms rear space, and a partition plate that partitions the front space from the rear space. The loudspeaker is incorporated in the front space, and the electronic circuit is incorporated in the rear space. The front case is fastened to the partition plate by a front screw fastening unit, the rear case is fastened to the partition plate by a rear screw fastening unit, and the front screw fastening unit and the rear screw fastening unit are disposed at different locations in a plate surface direction of the partition plate.

In some implementations of the in-vehicle sound emitting device of the present disclosure, two of the partition plates having the same structure may be used. The front case may be fastened to one of the partition plates, and the rear case may be fastened to the other. The front case and the rear case may be mounted on a vehicle body with the front case and the rear case being separated from each other.

In some implementations of the in-vehicle sound emitting device of the present disclosure, no hole of the front screw fastening unit is present in a partition wall portion of the partition plate that covers an opening of the rear case with the rear case fastened to the partition plate, and a hole of the rear screw fastening unit is present in the partition wall portion of the partition plate that covers an opening of the front case with the front case fastened to the partition plate.

In some implementations of the in-vehicle sound emitting device of the present disclosure, the front screw fastening unit is located on the outer side of the rear screw fastening unit in the partition wall portion of the partition plate.

In some implementations of the in-vehicle sound emitting device of the present disclosure, the partition plate is made of a metal, and the partition plate is in direct contact with a heat generating part of the electronic circuit in the rear space or in indirect contact with the heat generating part via a heat transfer member.

In some implementations of the in-vehicle sound emitting device of the present disclosure, the front case having the loudspeaker housed therein and the rear case having the electronic circuit housed therein can be separately fastened to the partition plate via the screwing portion. As a result, the assembly work of the device is facilitated.

In addition, by using two partition plates having the same structure, one partition plate can cover the opening of the front case, and the other partition plate can cover the opening of the rear case. In this way, the front case and the rear case can be separated from each other, and the cases can be mounted in a vehicle. Furthermore, a hole of the rear screw fastening unit may be disposed in a portion that covers the opening of the front case so as to be used as a ventilation hole.

DETAILED DESCRIPTION OF THE DRAWINGS

An in-vehicle sound emitting device 1 according to one form of the present disclosure illustrated in FIGS. 1 to 5 is mounted on an electric or hybrid vehicle and is used as an acoustic vehicle alerting system (AVAS). An in-vehicle sound emitting device 1 is disposed in a vehicle body at a position close to an outside of the vehicle. Thus, the in-vehicle sound emitting device 1 needs to have high sealability from rainwater and dust. In addition, the in-vehicle sound emitting device 1 needs to withstand a rise in temperature due to heat generated by a loudspeaker. Furthermore, the in-vehicle sound emitting device 1 needs to withstand a sudden change in an outside air temperature. In the case of a hybrid vehicle, the in-vehicle sound emitting device 1 further needs to withstand a high temperature environment when being disposed near the engine compartment.

Figure 1:
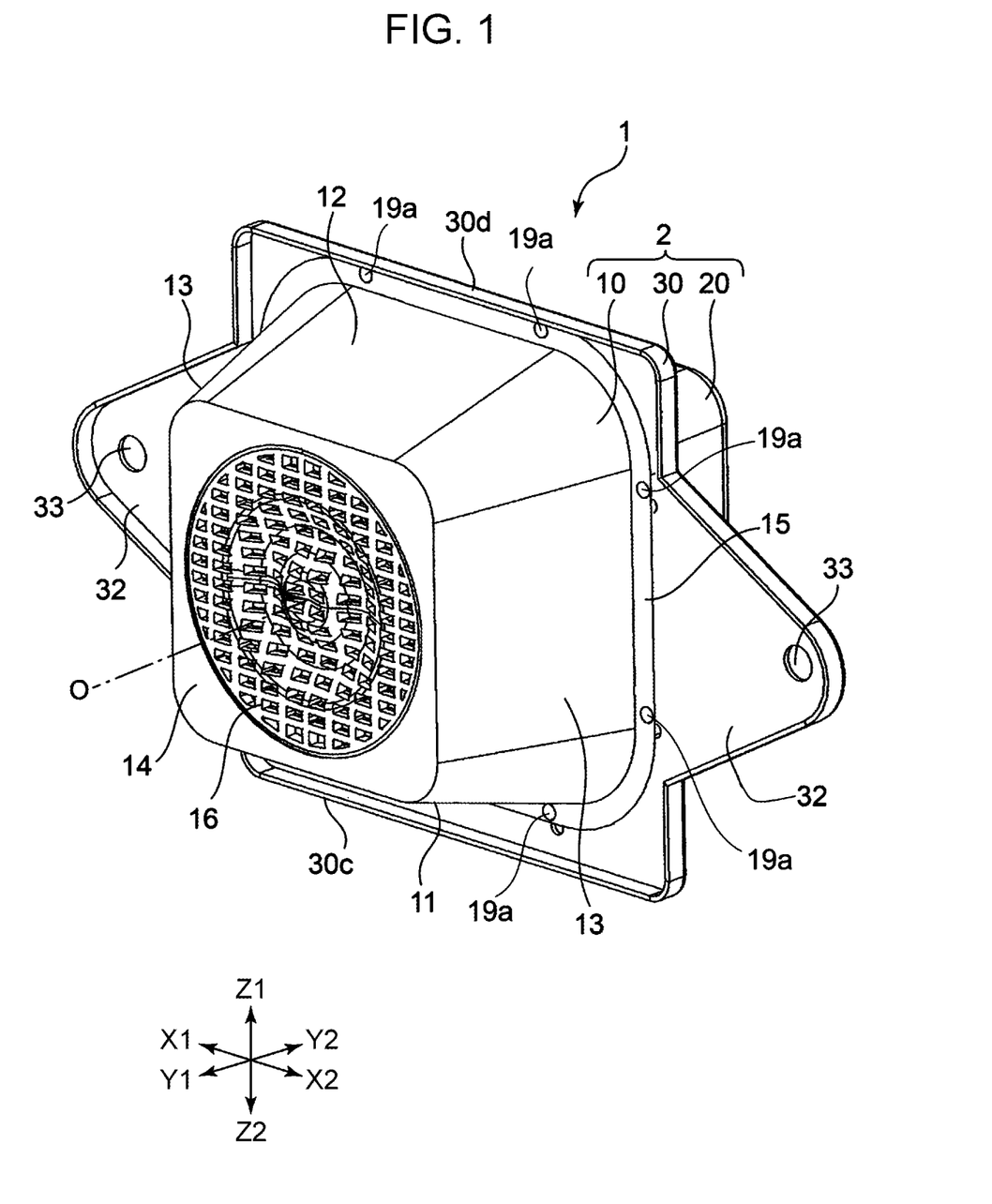
FIG. 1 is a perspective view illustrating the external appearance of one form an in-vehicle sound emitting device.
Figure 2:
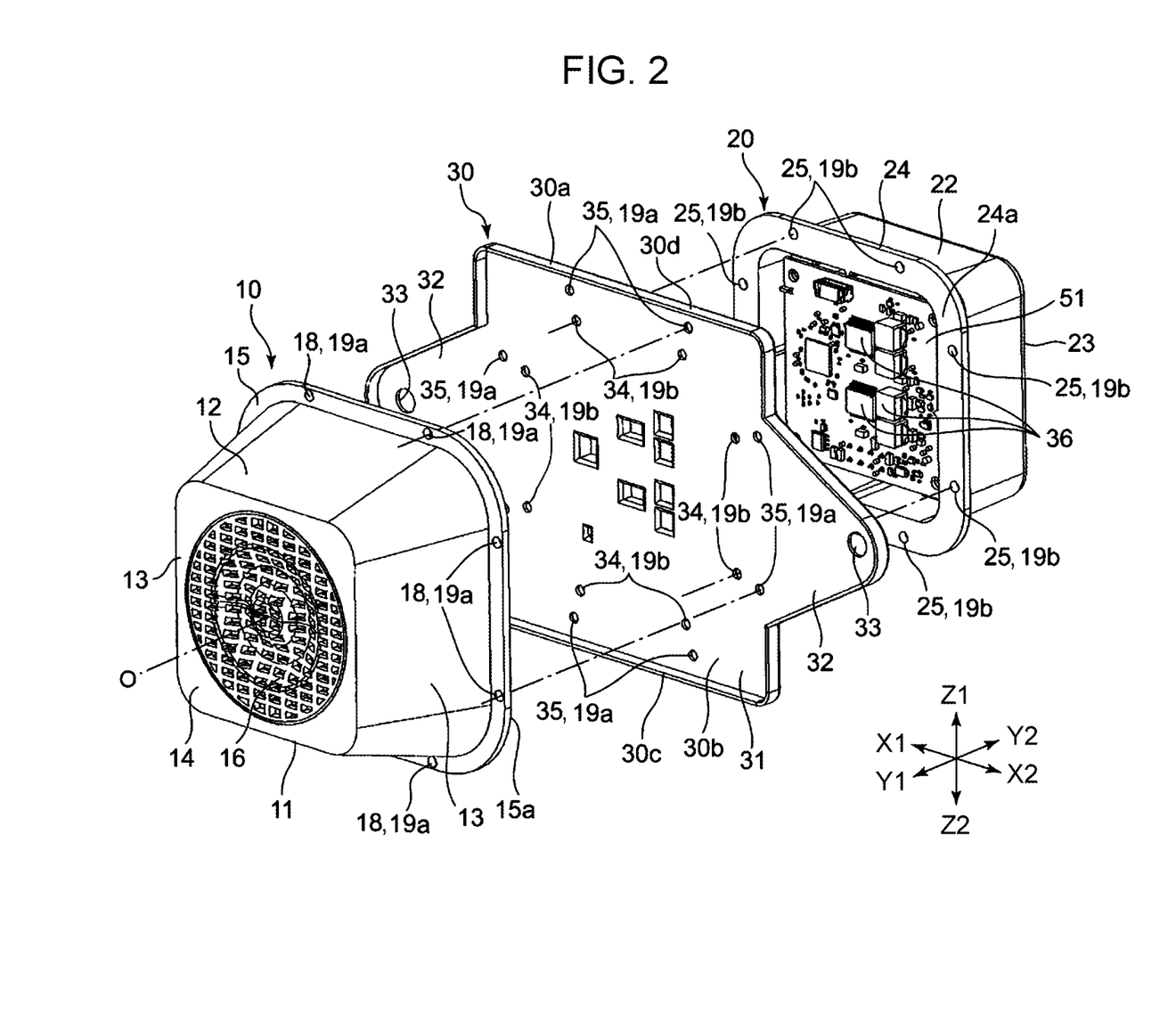
FIG. 2 is an exploded perspective view of the in-vehicle sound emitting device illustrated in FIG. 1.
Figure 3:
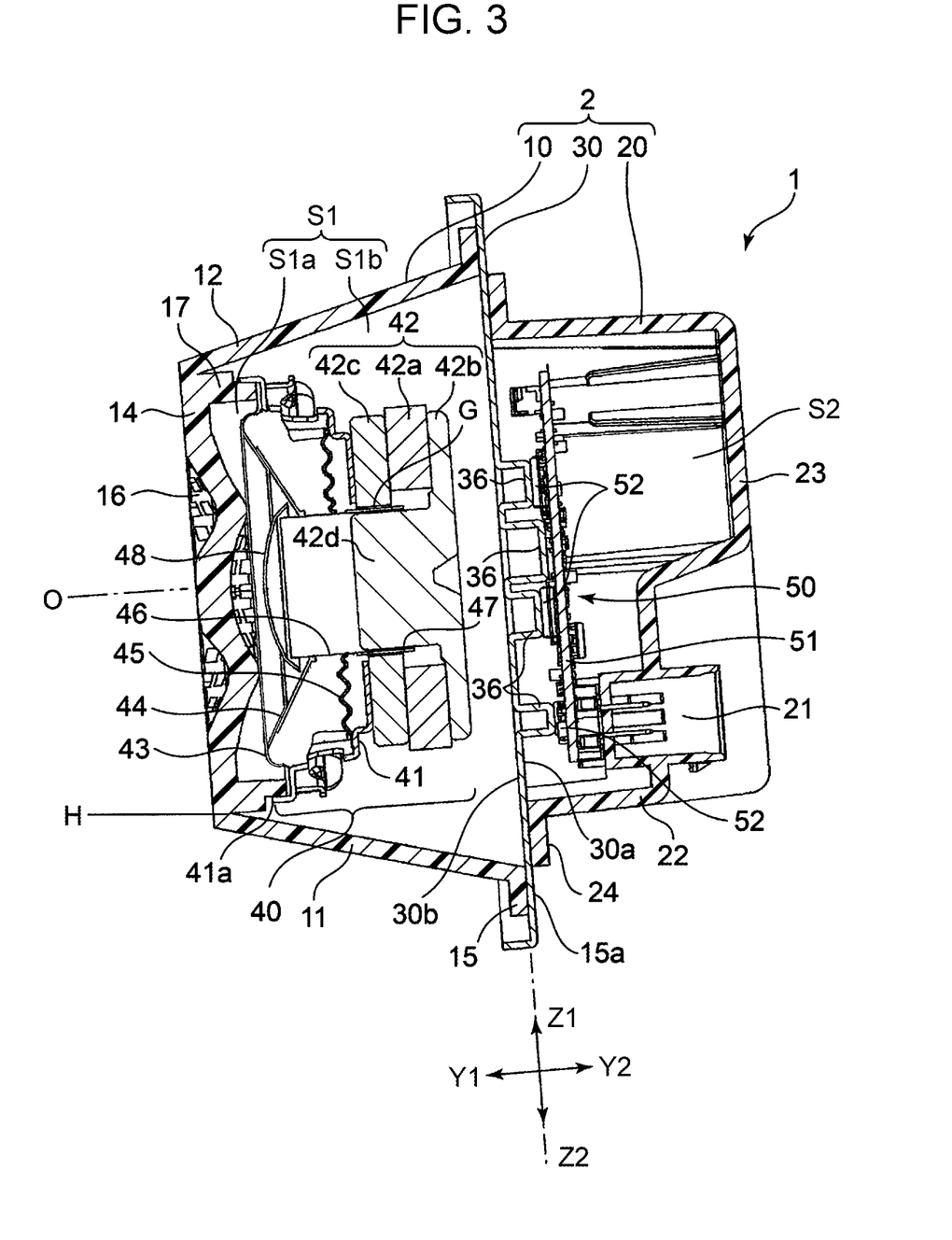
FIG. 3 is a vertical cross-sectional view of the in-vehicle sound emitting device illustrated in FIG. 1.
Figure 4:
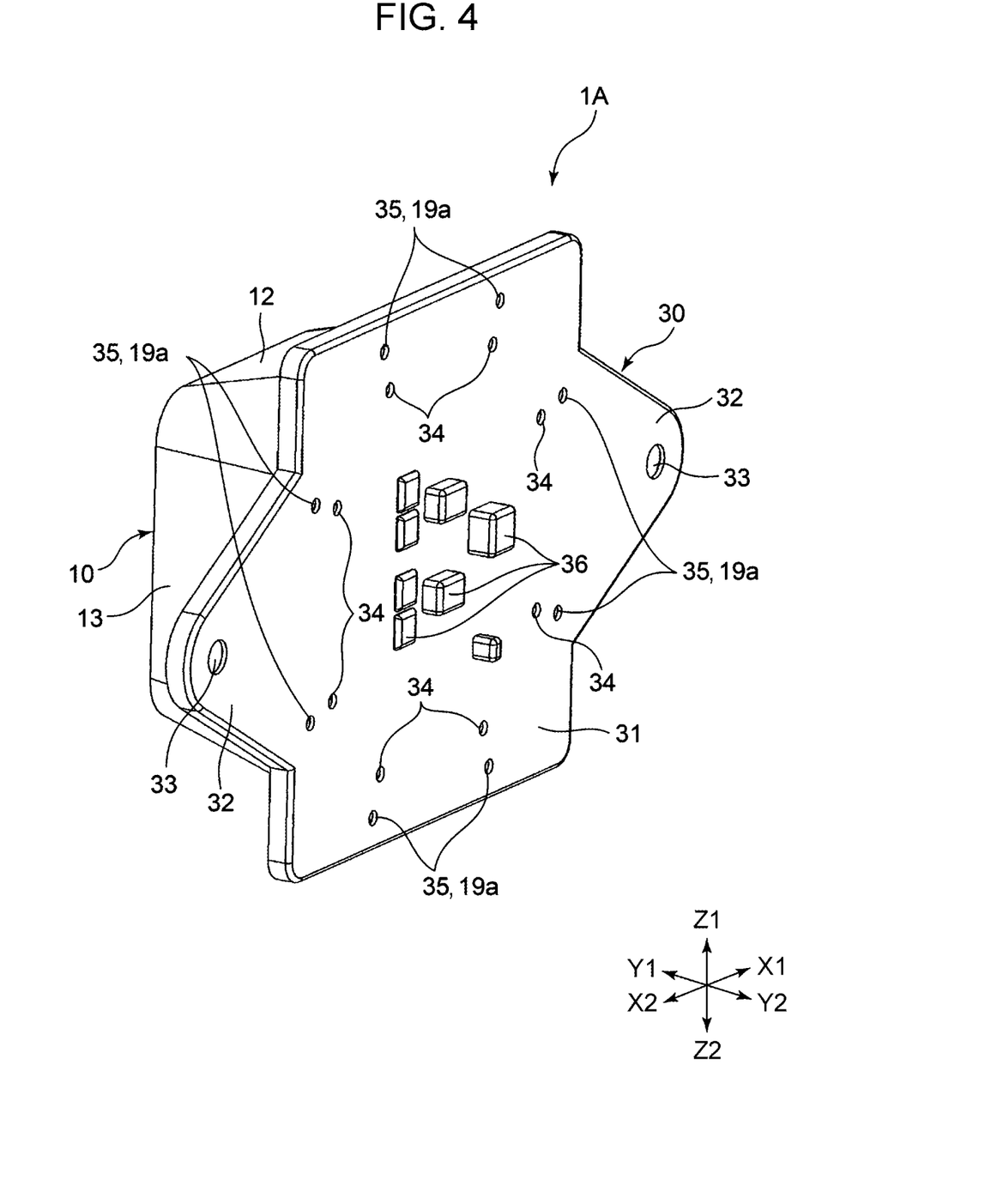
FIG. 4 is a perspective view of a front case having a partition plate fastened thereto.
Figure 5:
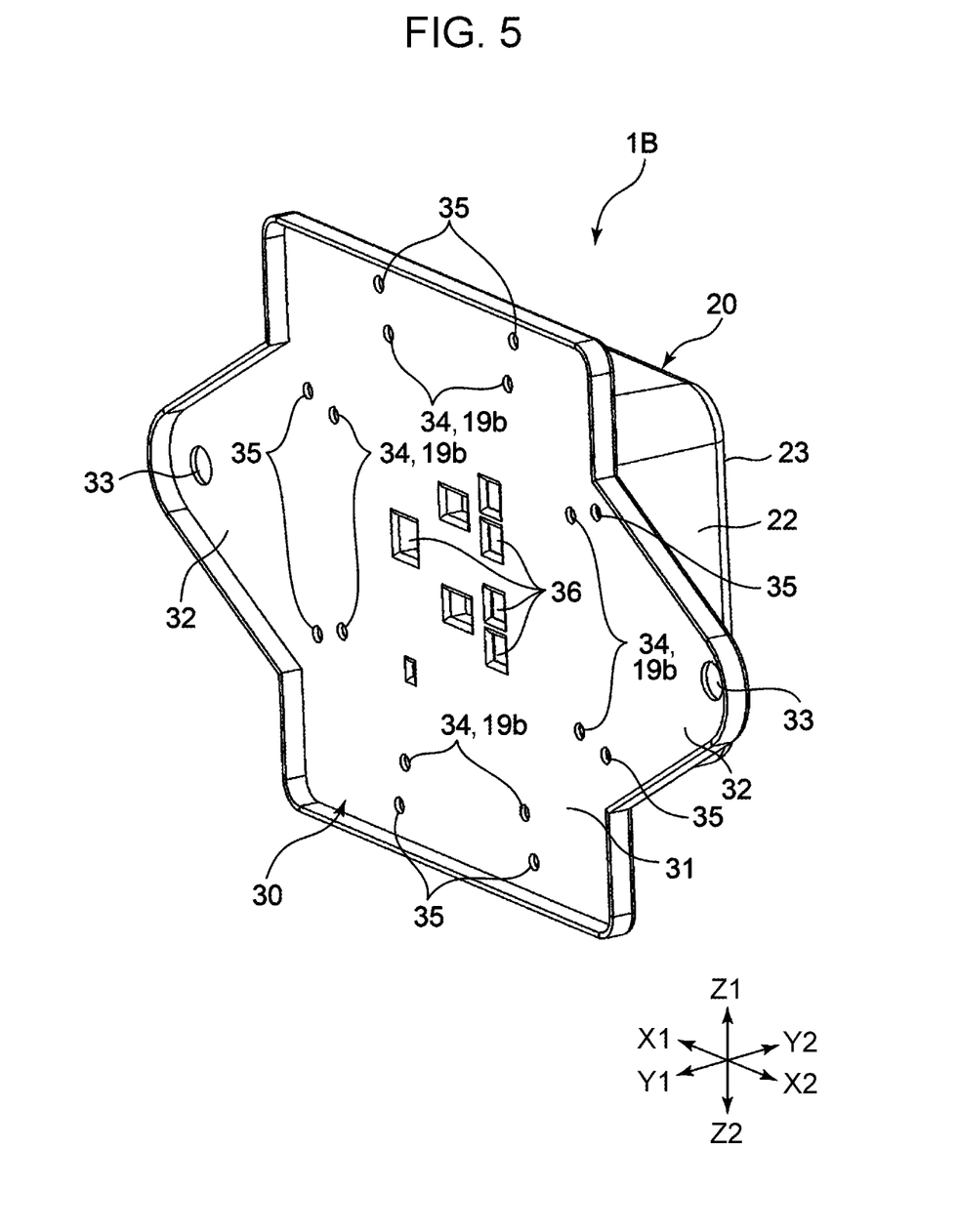
FIG. 5 is a perspective view of a rear case having a partition plate fastened thereto.

As illustrated in FIGS. 1 to 3, an in-vehicle sound emitting device 1 according to one form of the present disclosure is mounted in the vehicle with a loudspeaker 40 and an electronic circuit 50 housed in a case 2. However, as illustrated in FIGS. 4 and 5, the case 2 may be separated into a front case 10 and a rear case 20, the loudspeaker 40 may be housed in the front case 10, and the electronic circuit 50 may be housed in the rear case 20. Then, the in-vehicle sound emitting device 1 may be mounted in the vehicle at a position so that the loudspeaker 40 is separated from the electronic circuit 50.

In FIGS. 1 to 6, the coordinate axes X, Y, and Z orthogonal to one another are denoted by arrows. A Y1-Y2 direction is the front-rear direction, the Y1 direction is the front and the main sound emission direction, and the Y2 direction is the rear direction. The Z1-Z2 direction is the up-down direction, the Z1 direction is the upward direction, and the Z2 direction is the downward direction. The X1-X2 direction is the right-left direction, the X1 direction is the left direction, and the X2 direction is the right direction. The X-axis, Y-axis, and Z-axis that are orthogonal to one another are defined on the basis of the in-vehicle sound emitting device 1.

The center line O of the case 2 is illustrated in FIGS. 1 to 3. The center line O passes through the center of the cross section parallel to the X-Z plane of the case 2. Furthermore, the center line O passes through the center of the case 2 in the right-left direction (the X1-X2 direction) and the center of the case 2 in the up-down direction (the Z1-Z2 direction). FIG. 3 illustrates a cross section of the in-vehicle sound emitting device 1 mounted in the vehicle body. The in-vehicle sound emitting device 1 stays in a position where the center line O is tilted counterclockwise with respect to a horizontal direction H on the ground surface. Since the X, Y, and Z axes are defined on the basis of the in-vehicle sound emitting device 1, the Y and Z axes are also tilted counterclockwise about the X axis.

The case 2 consists of the front case 10, the rear case 20, and a partition plate 30 located between the front case 10 and the rear case 20. The front case 10 and the rear case 20 are made of a synthetic resin material. As illustrated in FIG. 3, a connector portion 21 is provided at the rear portion of the rear case 20, and a metal grommet is inserted into the connector portion 21. The partition plate 30 is formed from a metal plate, such as a steel plate or an aluminum plate. As can be seen from the cross-sectional view of FIG. 3, the inside of the front case 10 is front space S1, and the inside of the rear case 20 is rear space S2. The front space S1 and the rear space S2 are front and rear spaces partitioned by the partition plate 30.

The front case 10 has a lower wall portion 11 located as the lowermost portion (in the Z2 direction), an upper wall portion 12 located as the uppermost portion (in the Z1 direction), and right and left side wall portions 13, 13. A front wall portion 14 is provided as the front end portion of the front case 10 (in the Y1 direction). As illustrated in FIGS. 1 and 2, a flange-like joining/fixing portion 15 is integrally formed in the rear portion of the front case 10. The joining/fixing portion 15 protrudes from the lower wall portion 11, the upper wall portion 12, and the rear ends of the side wall portions 13, 13 in the radially outward direction of the case 2. A sound emission communication portion 16 is provided in the front wall portion 14 of the front case 10. As illustrated in FIGS. 1 and 2, the sound emission communication portion 16 has a plurality of openings formed in a circular region centered on the center line O. As illustrated in FIG. 3, a continuous protrusion 17 is integrally formed on the inner surface of the front wall portion 14 so as to surround the entire circumference of the sound emission communication portion 16.

In the rear case 20, a side wall portion 22 that surrounds the entire region in the up-down and right-left directions and a rear wall portion 23 that closes the rear end portion are integrally formed, and the connector portion 21 is formed in the rear wall portion 23. A flange-like joining/fixing portion 24 is formed in the front portion of the rear case 20. The joining/fixing portion 24 protrudes from the front end portion of the side wall portion 22 in the radially outward direction of the case 2.

Figure 6:
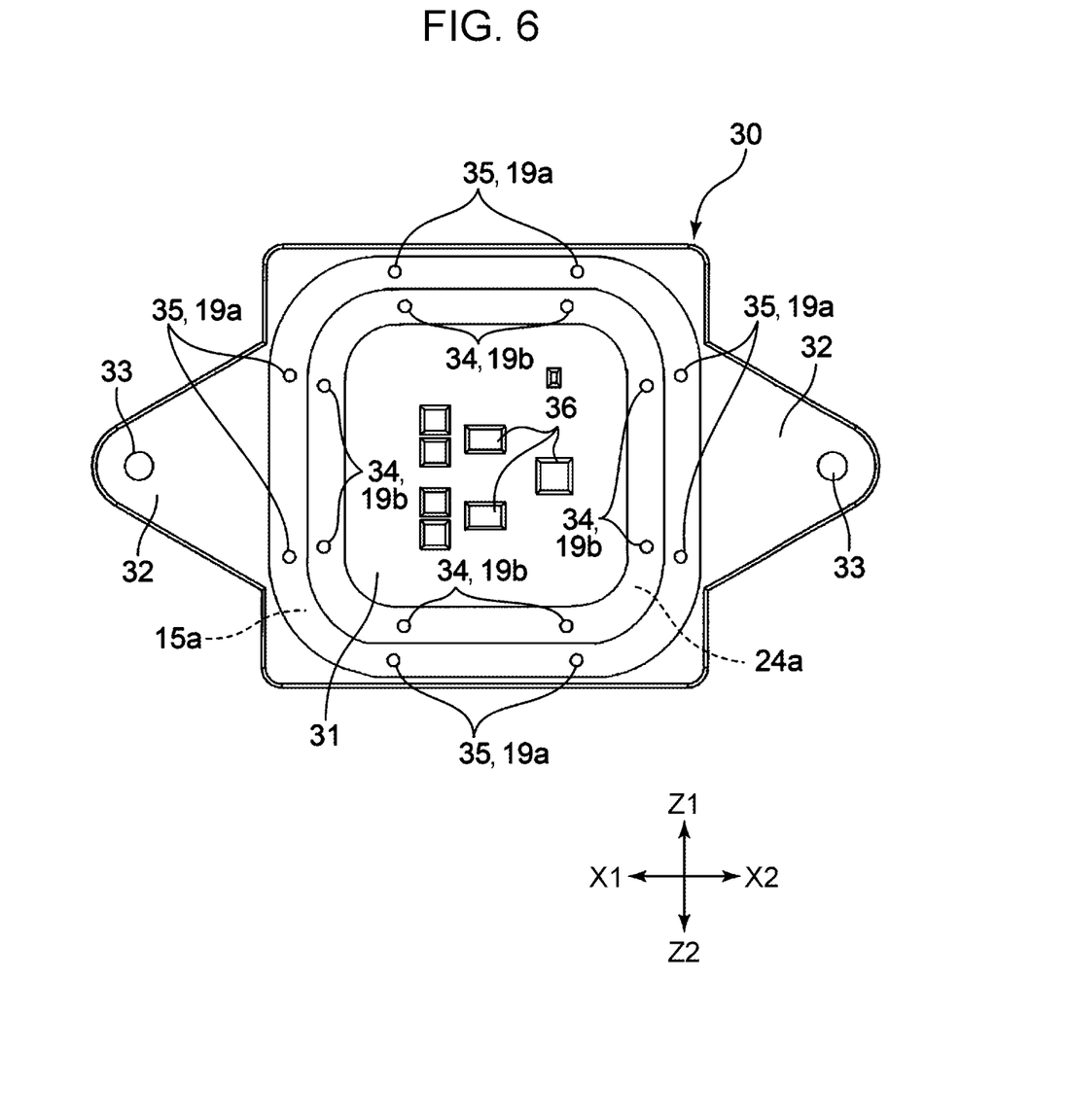
FIG. 6 is a front view of a partition plate for illustrating the positions in the partition plate at which a front screw fastening unit and a rear screw fastening unit are formed.

As illustrated in FIGS. 2 and 6, the partition plate 30 formed from a metal plate has a rectangular partition wall portion 31 and mounting strips 32 that protrude in the right-left direction (the X1-X2 direction). Each of the mounting strips 32 has a mounting hole 33 formed therein. The in-vehicle sound emitting device 1 has a first installation mode in which, as illustrated in FIG. 1, the front case 10 and the rear case 20 are fastened to the partition plate 30 and a second installation mode in which, as illustrated in FIGS. 4 and 5, the front case 10 is separated from the rear case 20. In both of the first and second installation modes, the in-vehicle sound emitting device 1 is fastened to the vehicle body by using the mounting holes 33.

As illustrated in FIGS. 2 and 6, two rearward fixing holes 34 are formed in each of the upper section, lower section, right side section, and left side section of the partition wall portion 31 of the partition plate 30. In the upper section of the partition wall portion 31, two frontward fixing holes 35 are formed at two locations above the two rearward fixing holes 34. In the lower section of the partition wall portion 31, two frontward fixing holes 35 are formed at two locations below the two rearward fixing holes 34. Furthermore, in the left side section of the partition wall portion 31, two frontward fixing holes 35 are formed at two locations to the left of the two rearward fixing holes 34. In the right side of the partition wall portion 31, two frontward fixing holes 35 are formed at two locations to the right of the two rearward fixing holes 34.

As illustrated in FIG. 2, two female screw holes 25 are formed in each of the upper section, lower section, left side section, and right side section of the joining/fixing portion 24 of the rear case 20. A total of eight female screw holes 25 and the eight rearward fixing holes 34 formed in the partition wall portion 31 are located at positions that coincide with each other as viewed in the front-rear direction. The forward facing surface of the joining/fixing portion 24 of the rear case 20 is a flat fixing surface 24a. The fixing surface 24a is placed so as to be in tight contact with a rear surface 30a of the partition plate 30. Thereafter, fastening screws (not illustrated) inserted from the front into the respective rearward fixing holes 34 are screwed into the female screw holes 25 to fasten the rear case 20 to the partition wall portion 31. The rearward fixing holes 34 and the female screw holes 25 constitute a rear screw fastening unit 19b. Note that in the rear screw fastening unit 19b, a rearward fixing hole may be formed in the joining/fixing portion 24, a female screw hole may be formed in the partition plate 30, and a fastening screw may be inserted into the joining/fixing portion 24 and, thus, the joining/fixing portion 24 may be screwed to the partition plate 30. Alternatively, rearward fixing holes may be formed in each of the joining/fixing portion 24 and the partition plate 30, and the joining/fixing portion 24 and the partition plate 30 may be fastened to each other by bolts and nuts.

It is desirable that a packing, such as an elastic sheet, be interposed between the fixing surface 24a of the joining/fixing portion 24 and the rear surface 30a of the partition plate 30. By fastening the joining/fixing portion 24 to the partition wall portion 31, a front facing opening of the rear case 20 is closed by the partition wall portion 31 and, thus, the rear space S2 inside the rear case 20 is sealed.

As illustrated in FIG. 2, two female screw holes 18 are formed in each of an upper section, lower section, right side section, and left side section of the joining/fixing portion 15 of the front case 10. A total of eight female screw holes 18 and the eight frontward fixing holes 35 formed on the partition wall portion 31 are located at positions that coincide with each other as viewed in the front-rear direction. The rear facing surface of the joining/fixing portion 15 of the front case 10 is a flat fixing surface 15a. The fixing surface 15a is placed so as to be in tight contact with a front surface 30b of the partition plate 30. Thereafter, fastening screws (not illustrated) inserted from the rear into the respective frontward fixing holes 35 are screwed into the female screw holes 18 to fix the partition wall portion 31 to the front case 10. The frontward fixing holes 35 and the female screw holes 18 constitute a front screw fastening unit 19a. Note that in the front screw fastening unit 19a, a rearward fixing hole may be formed in the joining/fixing portion 15, a female screw hole may be formed in the partition plate 30, and a fastening screw may be inserted into the joining/fixing portion 15 and, thus, the joining/fixing portion 15 may be screwed to the partition plate 30. Alternatively, rearward fixing holes may be formed in each of the joining/fixing portion 15 and the partition plate 30, and the joining/fixing portion 15 and the partition plate 30 may be fastened to each other by bolts and nuts.

It is desirable that a packing, such as an elastic sheet, be interposed between the fixing surface 15a of the joining/fixing portion 15 and the front surface 30b of the partition plate 30.

As illustrated in FIG. 6, the rearward fixing holes 34 of the rear screw fastening unit 19b are formed at a total of eight locations in the upper section, lower section, right side section, and left side section. In addition, the frontward fixing holes 35 of the front screw fastening unit 19a are formed at a total of eight locations in the upper section, lower section, right side section, and left side section located on an outer side of the rearward fixing holes 34. The rearward fixing holes 34 of the rear screw fastening unit 19b and the frontward fixing holes 35 of the front screw fastening unit 19a are formed in different positions so as not to overlap each other in the plate surface direction (the X-Z plane direction) of the partition plate 30. The frontward fixing holes 35 of the front screw fastening unit 19a are located on the outer side of the joining/fixing portion 24 of the rear case 20 so as not to overlap the rear case 20 as viewed in the front-rear direction. The rearward fixing holes 34 of the rear screw fastening unit 19b are formed at positions that overlap the rear facing opening of the front case 10 and that are on the inner side of the joining/fixing portion 15 of the front case 10 so as not to overlap the joining/fixing portion 15 as viewed in the front-rear direction.

As illustrated in FIG. 3, the loudspeaker 40 is mounted in the front space Si inside the front case 10. The loudspeaker 40 includes a frame 41. A magnetic circuit 42 is fixed to a rear portion of the frame 41. The magnetic circuit 42 includes a magnet 42a, a rear yoke 42b fixed to the rear surface of the magnet 42a, and a ring-shaped front yoke 42c fixed to the front surface of the magnet 42a. The rear yoke 42b and the front yoke 42c are made of a magnetic metal material. The center portion of the rear yoke 42b is a center yoke 42d that extends forward. A magnetic gap G is formed in a facing portion between the outer circumference surface of the center yoke 42d and the inner circumference surface of the front yoke 42c.

In the loudspeaker 40, the front end of the frame 41 serves as the ring-shaped diaphragm support portion 41a. An edge member 43 is sandwiched and fixed between the rear end of the continuous protrusion 17 of the front case 10 and the diaphragm support portion 41a, and the outer circumferential edge of a cone-shaped diaphragm 44 is joined to the inner side of the edge member 43. A bobbin 46 is joined to the center portion of the diaphragm 44, and a voice coil 47 is wound around the rear end of the bobbin 46. Thus, the voice coil 47 is formed. The voice coil 47 is inserted into the magnetic gap G of the magnetic circuit 42. A damper member 45 having a corrugated cross section is provided between the frame 41 and the bobbin 46. A center cap 48 is fixed to the center portion of the diaphragm 44, and the internal space of the bobbin 46 is covered by the center cap 48. In the loudspeaker 40, a voice current flowing in the voice coil 47 and the magnetic field intersecting the magnetic gap G cause the diaphragm 44 to vibrate in the front-rear direction, and the sound pressure is given forward through the sound emission communication portion 16.

As illustrated in FIG. 3, in the front case 10, the sound emission communication portion 16 is open in the front wall portion 14. Inside the front wall portion 14, the continuous protrusion 17 is integrally formed so as to continuously surround the periphery of the sound emission communication portion 16, and the diaphragm support portion 41a of the loudspeaker 40 is fastened to the rear end surface of the continuous protrusion 17. The front space S1 inside the front case 10 is partitioned into a front space region S1a between the front wall portion 14 and the diaphragm 44 and a rear space region Sib behind the diaphragm 44. The front space region S1a communicates with the external space in front of the case 2 through the sound emission communication portion 16. The sound emission communication portion 16 is covered from the inside by the edge member 43, the diaphragm 44, and the center cap 48, and the rear of the front case 10 is covered by the partition wall portion 31 of the partition plate 30.

As illustrated in FIG. 3, an electronic circuit 50 is incorporated into the rear space S2 inside the rear case 20. The electronic circuit 50 includes a circuit board 51 fixedly disposed inside the rear case 20, and a plurality of electronic components are mounted on the circuit board 51. Part of the partition plate 30 has a raised portion 36 integrally formed therein, which rises toward the inside of the rear space S2, and the raised portion 36 extends so as to be close to or in direct contact with heat-generating electronic components 52 mounted on the circuit board 51. Alternatively, the raised portion 36 is in indirect contact with the electronic components 52 via a heat-transfer member, such as a heat transferable sheet member or heat transferable oil. In addition, the raised portion 36 is close to or in contact with a heat-generating part, such as a coil mounted on the circuit board 51 and a conductive pattern that allows heat to pass therethrough. The heat generated by the electronic circuit 50 in the rear space S2 is transferred from the raised portion 36 to the partition plate 30 and is dissipated into the outside air through a portion exposed to the outside of the case 2, such as the mounting strip 32. A portion of the partition plate 30 except for the raised portion 36 may be close to or in direct contact with the heat-generating electronic components 52 and the conductive patterns.

A method for assembling the in-vehicle sound emitting device 1 and the installation modes of the in-vehicle sound emitting device 1 in a vehicle are described below. FIGS. 1 to 3 illustrate the in-vehicle sound emitting device 1 used in the first installation mode. In the first installation mode, one partition plate 30 is used, and the front case 10 and the rear case 20 are fastened to the partition plate 30. Thus, one case 2 is formed. To assemble the in-vehicle sound emitting device 1, the diaphragm support portion 41a of the frame of the loudspeaker 40 is fastened to the continuous protrusion 17 of the front case 10, and the loudspeaker 40, in which the diaphragm 44, the voice coil 47, the magnetic circuit 42, and the like are supported by the frame 41, is fixedly disposed in the front space S1 inside the front case 10. In addition, the electronic circuit 50 having electronic components mounted on a circuit board 51 is fixedly disposed in the rear space S2 inside the rear case 20.

The fixing surface 24a of the rear case 20 having the incorporated electronic circuit 50 is placed against the rear surface 30a of the partition plate 30 with a packing therebetween, and fastening screws are inserted from the front into the rearward fixing holes 34 of the partition plate 30 and are screwed into the female screw holes 25 of the joining/fixing portion 24. Thus, the partition plate 30 and the rear case 20 are fastened to each other. Subsequently, the fixing surface 15a of the front case 10 having the incorporated loudspeaker 40 is placed against the front surface 30b of the partition plate 30 with a packing therebetween, and fastening screws are inserted into the frontward fixing holes 35 of the partition plate 30 from the rear and are screwed into the female screw holes 18 of the joining/fixing portion 15. Thus, the partition plate 30 and the front case 10 are fastened to each other.

As illustrated in FIG. 6, the rearward fixing holes 34 of the rear screw fastening unit 19b are located on the inner side of the fixing surface 15a of the front case 10. For this reason, the partition plate 30 and the rear case 20 need to be fastened to each other before the front case 10 is fastened. Since the frontward fixing holes 35 of the front screw fastening unit 19a is located on the outer side of the fixing surface 24a of the rear case 20 so as not to overlap the rear case 20, the front case 10 can be fastened to the partition plate 30 after the partition plate 30 and the rear case 20 are fastened to each other. In this way, by fixing the rear case 20 having the incorporated electronic circuit 50 to the partition plate 30 first and, thereafter, fixing the front case 10 having the incorporated loudspeaker 40 to the partition plate 30, the assembly work of the in-vehicle sound emitting device 1 is facilitated.

In the in-vehicle sound emitting device 1, the front opening of the rear case 20 is closed by the partition wall portion 31 of the partition plate 30 and, thus, the rear space S2 is sealed. Therefore, even when the in-vehicle sound emitting device 1 is exposed to rainwater or dust, the electronic circuits 50 in the rear space S2 can be protected from the rainwater and dust. The electronic circuit 50 includes heat-generating electronic components 52 that constitute, for example, a power supply and an amplifier. The heat-generating electronic components 52 and a heat-generating part on the circuit board 51 are close to or in contact with the raised portion 36 formed on the partition plate 30. Accordingly, the heat generated by the heat-generating part is transferred from the raised portions 36 to the partition plate 30 and is dissipated to the external space of the case 2. As a result, excessive temperature rise in the rear space S2 can be prevented.

A loudspeaker 40 is mounted inside the front case 10. The sound emission communication portion 16 formed in the front wall portion 14 of the front case 10 is covered from the inside by the edge member 43, the diaphragm 44, and the center cap 48. In addition, the rearward facing opening of the front case 10 is closed by the partition wall portion 31 of the partition plate 30. As a result, it is possible to prevent moisture and dust from entering the rear space region S1b located behind the diaphragm 44 through the sound emission communication portion 16.

FIGS. 4 and 5 illustrate a second installation mode of the in-vehicle sound emitting device 1. In the second installation mode, two partition plates 30 of the same shape are used. As illustrated in FIG. 4, one of the partition plates 30 is fastened to the joining/fixing portion 15 of the front case 10 having the incorporated loudspeaker 40 by the front screw fastening unit 19a, and a sound emission function unit 1A of the in-vehicle sound emitting device 1 is independently configured. As illustrated in FIG. 5, the other partition plate 30 is fastened to the joining/fixing portion 24 of the rear case 20 having the incorporated electronic circuit 50 by the rear screw fastening unit 19b, and the circuit container unit 1B of the in-vehicle sound emitting device 1 is independently configured.

In electric and hybrid vehicles, the in-vehicle sound emitting device 1 can be separated into the sound emission function unit 1A and the circuit container unit 1B, which can be mounted at different positions. For example, only the sound emission function unit 1A can be fixedly disposed in a narrow space in the vehicle body. In addition, only the circuit container unit 1B can be removed from the vehicle body without removing the sound emission function unit 1A from the vehicle body, and the electronic circuits 50 inside the rear case 20 can be adjusted individually. Furthermore, it is possible to use the sound emission function unit 1A commonly in different vehicle models and to use different electronic circuits 50 in the circuit container units 1B of the different vehicle models. The same front case 10, rear case 20, and partition plate 30 can be used for the first installation mode illustrated in FIGS. 1 to 3 and the second installation mode illustrated in FIGS. 4 and 5. Thus, common parts can be used for in-vehicle sound emitting devices.

In the sound emission function unit 1A illustrated in FIG. 4, the rearward facing opening of the front case 10 is closed by the partition wall portion 31. However, as illustrated in FIG. 6, in the partition plate 30, the rearward fixing hole 34, which constitutes the rear screw fastening unit 19b of the partition plate 30, is located inside the joining/fixing portion 15 of the front case 10, and the rearward fixing hole 34 is located in the rearward facing opening of the front case 10. Therefore, the rearward fixing hole 34 functions as a ventilation hole that enables the rear space region S1b of the front case 10 to communicate with the external space.

When the loudspeaker 40 inside the front case 10 is performing a sound emission operation, the heat generated by the voice coil 47 stays in the rear space region S1b, and the temperature around the magnetic circuit 42 tends to rise. If the temperature of the rear space region S1b rises, a pressure difference is generated between the region and the external space. Conversely, if the external temperature increases so as to be higher than the temperature of the rear space region S1b due to heat generated by the engine of the vehicle and the like, a pressure difference is generated between the rear space region S1b and the external space. If this pressure difference increases, the diaphragm 44 of the loudspeaker 40 is subjected to forward pressure or backward pressure. If this pressure increases, the vibration of the diaphragm 44 is affected, and the sound quality decreases. Furthermore, a failure, such as damage of the edge member 43, may occur. However, according to the sound emission function unit 1A of the in-vehicle sound emitting device 1, the rearward fixing holes 34 of the partition plate 30 functions as a ventilation hole. As a result, the pressure difference between the rear space region S1b and the external space can be eliminated through the rearward fixing hole 34.

According to the circuit container unit 1B illustrated in FIG. 5, the frontward fixing hole 35 of the front screw fastening unit 19a formed in the partition plate 30 is located on the outer side of the joining/fixing portion 24 of the rear case 20, and the frontward fixing hole 35 is not located in the forward facing opening of the rear case 20. As a result, the forward facing opening of the rear case 20 is completely closed by the partition wall portion 31 of the partition plate 30, and the inside of the rear space S2 is sealed. Therefore, moisture, such as rainwater, and dust do not enter the rear space S2 and, thus, the electronic circuits 50 in the circuit container unit 1B can be protected.

According to implementations of the present disclosure, the joining/fixing portion 15 of the front case and the joining/fixing portion 24 of the rear case 20 may have the same size, and the fixing surface 15a of the joining/fixing portion 15 and the fixing surface 24a of the joining/fixing portion 24 may overlap each other as viewed in the front-rear direction with the partition plate 30 therebetween. In this case, the front screw fastening unit 19a and the rear screw fastening unit 19b are displaced from each other in the right-left direction in both the upper and lower portions of the fixing surfaces 15a and 24a, and are displaced from each other in the up-down direction in both the left and right portions of the fixing surfaces 15a and 24a. In this way, even when the first installation mode is used, each of the front case 10 and the rear case 20 can be fastened to the partition plate 30. In this case, the packing between the fixing surface 15a of the front case 10 and the partition plate 30 and the packing between the fixing surface 24a of the rear case 20 and the partition plate 30 can be of the same shape and the same structure.

While there has been illustrated and described what is at presently contemplated to be preferred forms and implementations of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments, forms, and implementations falling within the scope of the appended claims.

What is claimed is:

1. An in-vehicle sound emitting device comprising:
a case;
a loudspeaker incorporated in the case; and
an electronic circuit incorporated in the case,
wherein the case includes a front case that forms front space, a rear case that forms rear space, and a partition plate that partitions the front space from the rear space,
wherein the loudspeaker is incorporated in the front space, and the electronic circuit is incorporated in the rear space, and
wherein the front case is fastened to the partition plate by a front screw fastening unit, the rear case is fastened to the partition plate by a rear screw fastening unit, and the front screw fastening unit and the rear screw fastening unit are disposed at different locations in a plate surface direction of the partition plate.

2. The in-vehicle sound emitting device according to claim 1, wherein:
no hole of the front screw fastening unit is present in a partition wall portion of the partition plate that covers an opening of the rear case with the rear case fastened to the partition plate; and
a hole of the rear screw fastening unit is present in the partition wall portion of the partition plate that covers an opening of the front case with the front case fastened to the partition plate.

3. The in-vehicle sound emitting device according to claim 2, wherein the front screw fastening unit is located on the outer side of the rear screw fastening unit in the partition wall portion of the partition plate.

4. The in-vehicle sound emitting device according to claim 3, wherein:
the front case has a flange-like front joining/fixing portion including the front screw fastening unit, and the rear case has a flange-like rear joining/fixing portion including the rear screw fastening unit, and
the front screw fastening unit is located on the outer side of the rear joining/fixing portion so as not to overlap the rear joining/fixing portion as viewed in a front-rear direction, and the rear screw fastening unit is located on the inner side of the front joining/fixing portion so as not to overlap the front joining/fixing portion as viewed in the front-rear direction.

5. The in-vehicle sound emitting device according to claim 1, wherein:
two of the partition plates having the same structure are used,
the front case is fastened to one of the partition plates, and the rear case is fastened to the other, and
the front case and the rear case are installed in a vehicle body with the front case and the rear case being separated from each other.

6. The in-vehicle sound emitting device according to claim 5, wherein:
   no hole of the front screw fastening unit is present in a partition wall portion of the partition plate that covers an opening of the rear case with the rear case fastened to the partition plate, and
   a hole of the rear screw fastening unit is present in the partition wall portion of the partition plate that covers an opening of the front case with the front case fastened to the partition plate.

7. The in-vehicle sound emitting device according to claim 6, wherein the front screw fastening unit is located on the outer side of the rear screw fastening unit in the partition wall portion of the partition plate.

8. The in-vehicle sound emitting device according to any one of claim 1, wherein:
   the partition plate is made of a metal, and
   the partition plate is in direct contact with a heat generating part of the electronic circuit inside the rear space or in indirect contact with the heat generating part via a heat transfer member.

\* \* \* \* \*